United States Patent
Ulrey et al.

(10) Patent No.: US 8,069,663 B2
(45) Date of Patent: *Dec. 6, 2011

(54) METHOD AND SYSTEM FOR TURBOCHARGING AN ENGINE

(75) Inventors: Joseph Norman Ulrey, Dearborn, MI (US); Ross Dykstra Pursifull, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/878,838

(22) Filed: Sep. 9, 2010

(65) Prior Publication Data

US 2011/0167815 A1 Jul. 14, 2011

(51) Int. Cl.
*F02B 33/44* (2006.01)
*F02M 25/07* (2006.01)
*F02M 25/06* (2006.01)
*F01L 1/34* (2006.01)
*F01N 5/04* (2006.01)

(52) U.S. Cl. ............ 60/605.2; 60/278; 60/280; 60/602; 123/568.12; 123/90.15

(58) Field of Classification Search ............ 60/602, 60/605.1–605.2, 280, 278; 123/568.12, 90.15–90.18, 123/316; *F02D 13/02, 23/00, 43/00; F02M 25/07*
See application file for complete search history.

(56) References Cited

U.S. PATENT DOCUMENTS

| | | | |
|---|---|---|---|
| 5,417,068 A | 5/1995 | Olofsson | 60/602 |
| 6,347,619 B1 | 2/2002 | Whiting et al. | 123/568.12 |
| 6,438,956 B1 | 8/2002 | Olofsson | 60/602 |
| 6,460,337 B1 | 10/2002 | Olofsson | 60/280 |
| 6,742,506 B1 | 6/2004 | Grandin | 123/568.12 |
| 6,826,903 B2* | 12/2004 | Yahata et al. | 123/568.12 |
| 7,165,540 B2 | 1/2007 | Brookshire et al. | 123/568.12 |
| 7,753,037 B2* | 7/2010 | Hatamura | 123/568.13 |
| 2006/0054148 A1* | 3/2006 | Aberle | 60/605.2 |
| 2007/0119168 A1 | 5/2007 | Turner | 60/602 |
| 2009/0223220 A1* | 9/2009 | Vuk | 60/602 |
| 2010/0212315 A1* | 8/2010 | Irisawa | 60/602 |

FOREIGN PATENT DOCUMENTS

| | | | |
|---|---|---|---|
| JP | 2002030980 A | * | 1/2002 |
| JP | 2003286905 A | * | 10/2003 |
| JP | 2008240675 A | * | 10/2008 |
| JP | 2010024974 A | * | 2/2010 |
| JP | 2010024975 A | * | 2/2010 |
| JP | 2010174859 A | * | 8/2010 |
| JP | 2010255603 A | * | 11/2010 |
| WO | 2009/022210 A2 | | 2/2009 |
| WO | 2010/007512 A1 | | 1/2010 |

OTHER PUBLICATIONS

Pursifull, Ross Dykstra et al., "Method and System Adjusting an Exhaust Heat Recovery Valve," U.S. Appl. No. 12/878,846, filed Sep. 9, 2010, 39 pages.

* cited by examiner

*Primary Examiner* — Thai Ba Trieu (74) *Attorney, Agent, or Firm* — Allan J. Lippa; Alleman Hall McCoy Russell & Tuttle LLP (57) ABSTRACT

A method for improving operation of a turbocharged engine is presented. In one embodiment, the method may reduce engine emissions and improve engine efficiency during an engine start.

20 Claims, 6 Drawing Sheets

METHOD AND SYSTEM FOR TURBOCHARGING AN ENGINE

FIELD

The present description relates to a method for improving operation of a turbocharged engine. The method may be particularly useful for reducing engine emissions and increasing engine efficiency after a cold start.

BACKGROUND AND SUMMARY

One way to increase engine efficiency is to reduce engine displacement and boost the engine. However, placing a turbine in an exhaust system can increase engine emissions and reduce engine efficiency during an engine start. In particular, engine emissions can be increased since the turbocharger may sink engine exhaust heat during an engine start rather than passing the exhaust heat to a catalyst to promote oxidation and reduction of exhaust gas constituents. Further, engine efficiency can be reduced when spark is retarded or air mass flow through the engine is increased to warm the mass of the turbocharger. Thus, engine boosting can make it more difficult to meet engine emissions and improve engine efficiency during engine starting.

The inventors herein have recognized the above-mentioned disadvantages and have developed an engine method, comprising: opening a first exhaust valve of a cylinder before a piston of the cylinder reaches BDC compression stroke of the cylinder; directing exhaust gases across the first exhaust valve into a first conduit; recovering heat from the exhaust gases in the first conduit to a liquid; and returning the exhaust gases to a second conduit that is in communication with a second exhaust valve of the cylinder.

Engine efficiency can be increased while engine emissions are reduced by separating the exhaust ports of a cylinder and separately processing blow down (e.g., expanding exhaust gases in a cylinder before time when a piston of the cylinder reaches bottom dead center expansion stroke) and residual exhaust gases (e.g., gases that remain in the cylinder after blow-down). In particular, exhaust energy can be transferred from the blow-down gases to operate a turbocharger or to reduce engine friction by quickly warming the engine via an exhaust heat recovery device such as a gas-to-liquid heat exchanger. At the substantially same time, residual gases are directed from a second exhaust port of the cylinder to heat a catalyst, thereby reducing engine emissions. In this way, exhaust gases can be used more efficiently than simply directing all the exhaust gas of a cylinder to a turbocharger.

The present description may provide several advantages. For example, the approach may improve fuel economy and reduce particulate emissions by decreasing engine warm-up time. Further, the method can reduce engine emissions since at least a portion of cylinder exhaust gases are directly routed from the cylinder to the catalyst. Further still, the average exhaust gas pressure supplied to the turbocharger can be increased to improve turbocharger output.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1A:
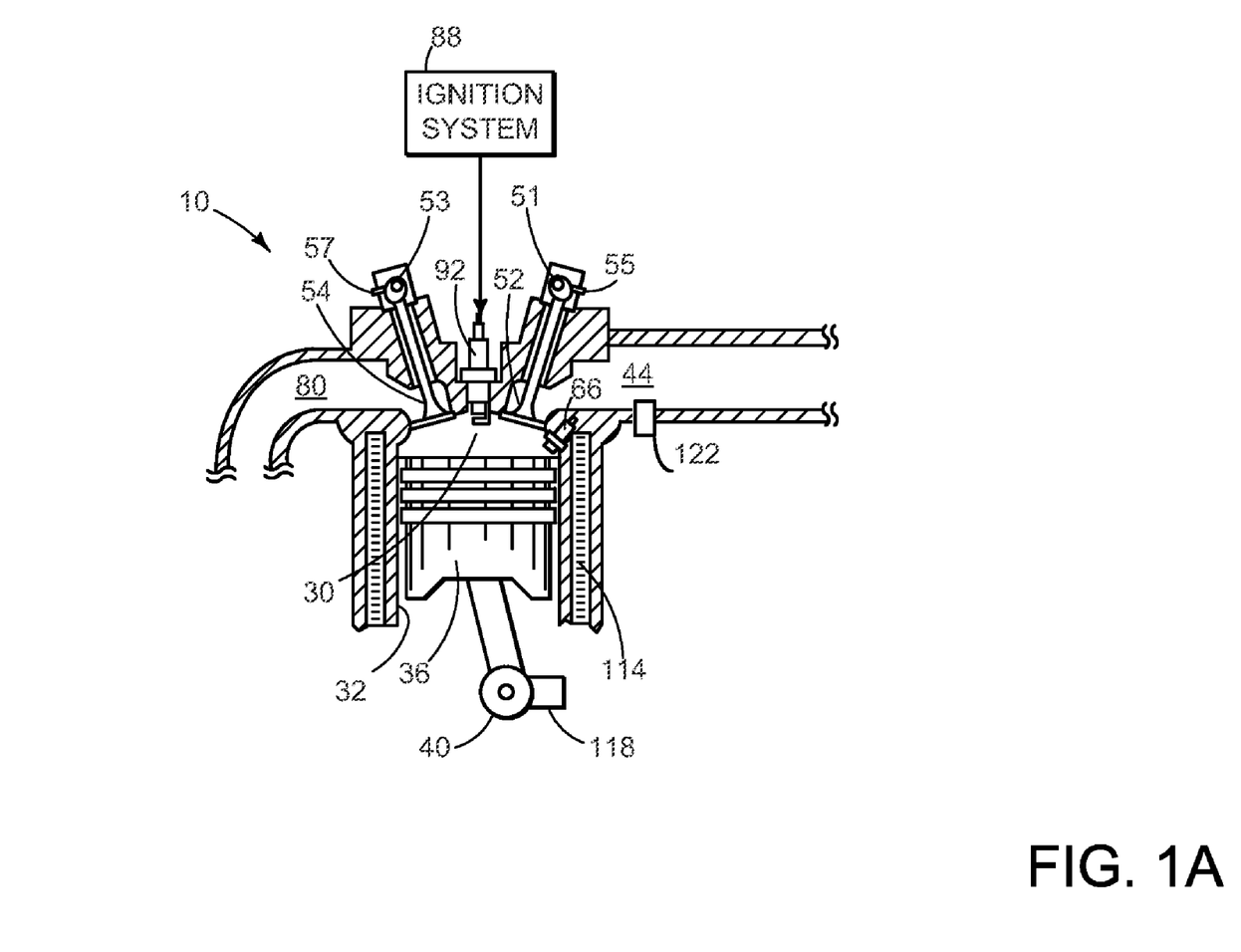
FIG. 1A is a schematic diagram of one cylinder of an engine.
Figure 1B:
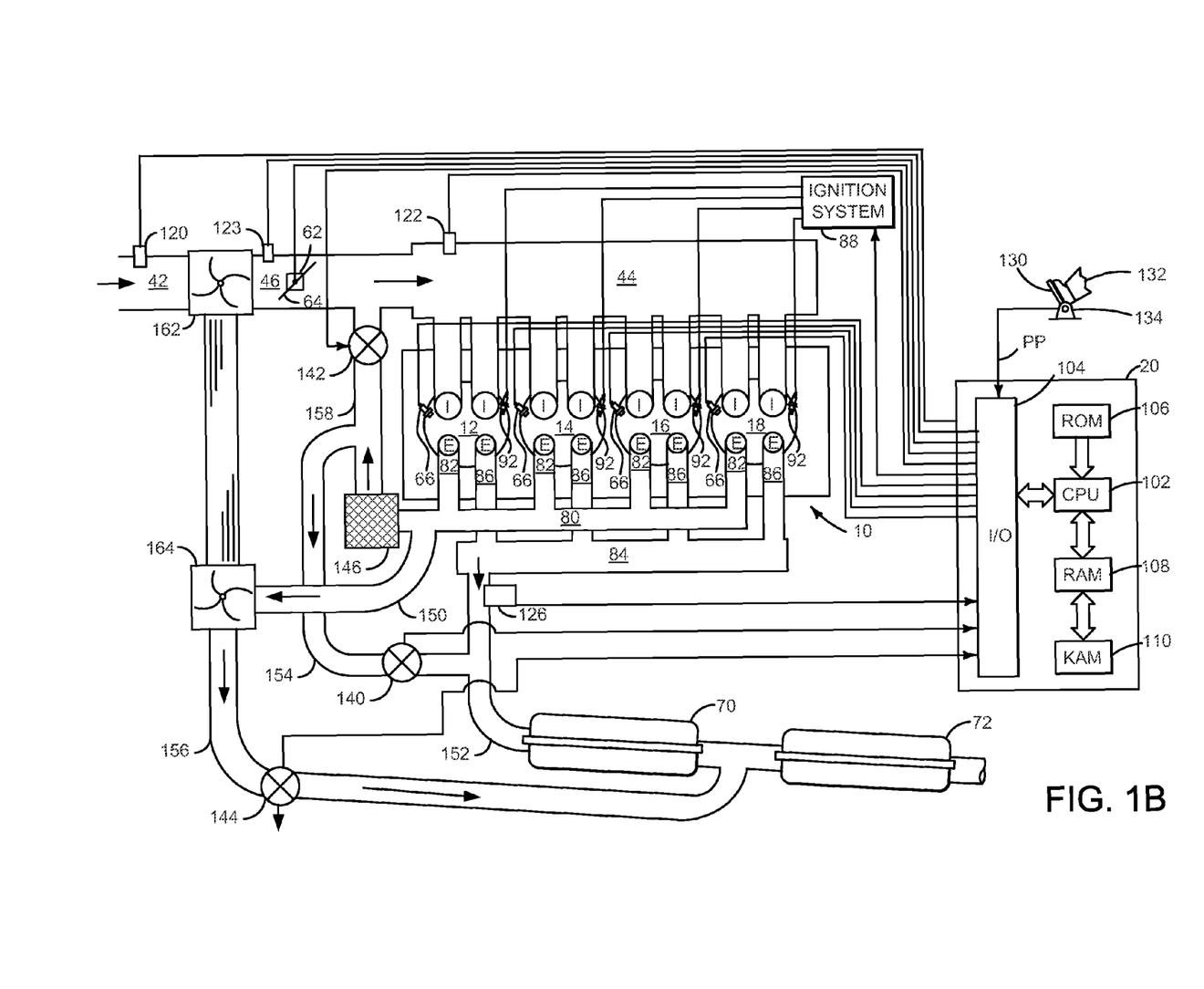
FIG. 1B is a schematic diagram of a four cylinder engine.

The present description is related to operating an engine. In one non-limiting example, the engine may be configured as illustrated in FIGS. 1A and 1B. In one example, blow-down gases of a cylinder are separated from residual cylinder gases and the engine is operated according to the methods of FIGS. 4A-4B providing the signals of FIGS. 2-3.

Figure 2:
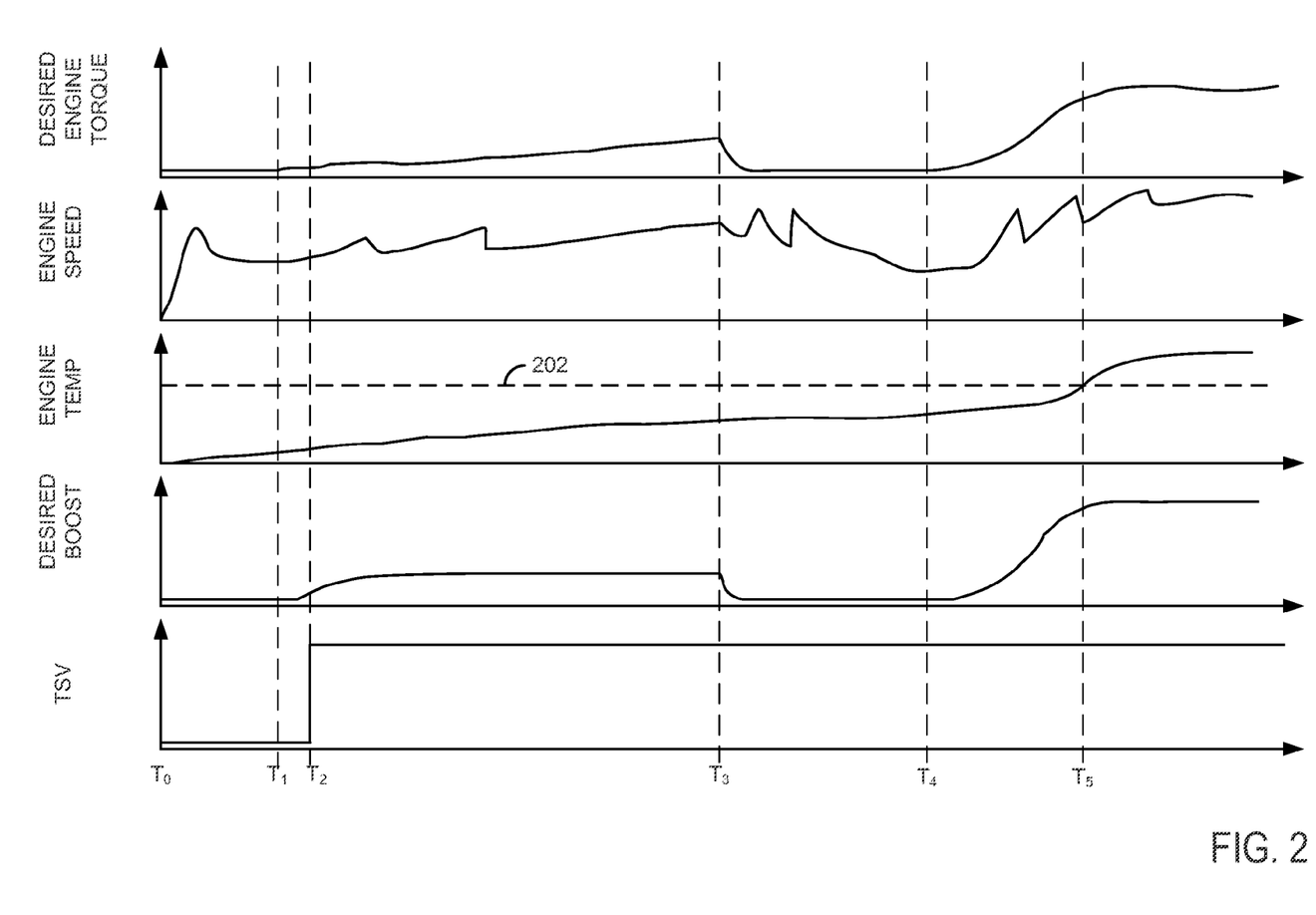
FIG. 2 shows simulated signals of interest when operating an engine.

Referring to FIG. 1A, a single cylinder of an internal combustion engine 10 is shown. Internal combustion engine 10 is comprised of a plurality of cylinders as shown in FIG. 2. Engine 10 includes combustion chamber 30, coolant sleeve 114, and cylinder walls 32 with piston 36 positioned therein and connected to crankshaft 40. Combustion chamber 30 is shown communicating with intake manifold 44 and exhaust manifold 80 via respective intake valves 52 and exhaust valves 54. Each intake and exhaust valve may be operated by an intake cam 51 and an exhaust cam 53. Alternatively, one or more of the intake and exhaust valves may be operated by an electromechanically controlled valve coil and armature assembly. The position of intake cam 51 may be determined by intake cam sensor 55. The position of exhaust cam 53 may be determined by exhaust cam sensor 57. In one example, exhaust cam 53 includes separate and different cam lobes that provide different valve profiles for each of two exhaust valves for combustion chamber 30. For example, a first cam profile of a first exhaust valve of combustion chamber 30 has a first lift amount and a first opening duration. A second cam profile of a second exhaust valve of combustion chamber 30 has a second lift amount and a second opening duration, the first lift amount less than the second lift amount and the first opening duration less than the second lift duration. In addition, in some examples, the phase of the first and second cam profiles may be individually adjusted relative to the phase of the engine crankshaft. Thus, the first cam profile can be positioned to open the exhaust valve BDC of the expansion stroke of combustion chamber 30. In particular, the first cam profile can open and close a first exhaust valve before BDC expansion stroke. Further, the first cam profile can be adjusted in response to engine speed to adjust exhaust valve opening and closing to selectively exhaust blow-down gas of combustion chamber 30. On the other hand, the second cam profile can open a second exhaust valve after BDC expansion stroke.

Thus, the timing of the first exhaust valve and the second exhaust valve can isolate cylinder blow-down gases from residual gases.

In an example where engine warm-up is not the priority mode, the majority of the initial blow-down energy is directed to the turbine. The remainder of expelled exhaust gas emerges at a low pressure and is directly routed to the exhaust after treatment with bypassing the turbine. The higher pressure exhaust gas is also optionally deployable as EGR or heatant for warming transmission fluid, engine oil, coolant, or engine air via a heat exchanger.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to the pulse width signal. Fuel is delivered to fuel injector 66 by a fuel system (not shown) including a fuel tank, fuel pump, and fuel rail (not shown). Distributorless ignition system 88 provides an ignition spark to combustion chamber 30 via spark plug 92

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 46, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Blow-down gases may be release from the cylinder before the cylinder reaches BDC if desired by opening at least one exhaust valve of an exhaust valve pair. Further, during the exhaust stroke, the other exhaust valve of an exhaust valve pair opens to release the residual combusted air-fuel mixture to exhaust manifold 80 and the piston returns to TDC. Note that the above is shown merely as an example, and that intake and exhaust valve opening and/or closing timings may vary, such as to provide positive or negative valve overlap, late intake valve closing, or various other examples.

Referring now to FIG. 1B, a schematic diagram of a four cylinder engine comprised of cylinders configured with cylinders as shown in FIG. 1A is shown. Engine 10 includes cylinder number one 12 with intake I valves and exhaust E valves. Likewise, cylinder number two 14, cylinder number three 16, and cylinder number four 18 include intake I and exhaust E valves. Cylinders are supplied air via intake manifold 44. In addition, intake manifold 44 is shown communicating with optional electronic throttle 62 which adjusts a position of throttle plate 64 to control air flow from intake boost chamber 46. Compressor 162 draws air from air intake 42 to supply intake boost chamber 46. Exhaust gases spin turbine 164 which is coupled to compressor 162. A high pressure, dual stage, fuel system may be used to generate fuel pressures at injectors 66.

Distributorless ignition system 88 provides an ignition spark to cylinders 12, 14, 16, and 18 via sparks plug 92 in response to controller 20. Exhaust from cylinders 12, 14, 16, and 18 is directed to exhaust manifolds 80 and 84 via exhaust runners 82 and 86. Exhaust runners 82 extend from cylinders 12, 14, 16, and 18 to exhaust manifold 80. Exhaust runners 86 extend from cylinders 12, 14, 16, and 18 to exhaust manifold 84. Exhaust runners 82 are isolated from exhaust runners 86 when at least one exhaust valve of each cylinder is in a closed position. Accordingly, exhaust from cylinders 12, 14, 16, 18 exits to exhaust runners 82 and 86 and only recombines downstream of valves 140 or 144 in the direction of exhaust flow. Alternatively, when exhaust gas recirculation is present by opening exhaust gas recirculation (EGR) valve 142, exhaust gases may flow to exhaust runners 82 and enter intake manifold 44. After entering intake manifold 44, exhaust gases may enter exhaust runners 86 after combustion events in cylinders 12, 14, 16, and 18. Thus, exhaust gases may not flow directly between exhaust runners 82 and 86.

The Universal Exhaust Gas Oxygen (UEGO) sensor 126 is shown coupled to exhaust manifold 84 upstream of catalysts 70 and 72. Alternatively, a two-state exhaust gas oxygen sensor may be substituted for UEGO sensor 126. Turbocharger turbine 164 receives exhaust gases from exhaust manifold 80 to power air compressor 162. Exhaust gas heat recovery device 146 also receives exhaust gases from exhaust manifold 80. In one example, exhaust gas heat recovery device is a gas-to-liquid heat exchanger. In another example, exhaust gas heat recovery device is a gas to gas heat exchanger. In still another example, exhaust gas heat recovery device 146 may be a Peltier device.

EGR valve 142, heat recovery valve (HRV) 140, and positive turbine shut-off valve 144 control the flow of exhaust gases from exhaust manifold 80. Exhaust from exhaust manifold 80 may flow to intake manifold 44 via conduit 158 when EGR valve 142 is in an open position. Exhaust from exhaust manifold 80 may flow to turbine 164 via conduit 150 when turbine shut-off valve 144 is in an open position. Exhaust from exhaust manifold 80 may flow to conduit 152 when HRV is in an open position.

Converters 70 and 72 can include multiple catalyst bricks, in one example. In another example, multiple emission control devices, each with multiple bricks, can be used. Converters 70 and 72 can be a three-way type catalyst in one example.

Controller 120 is shown in FIG. 1B as a conventional microcomputer including: microprocessor unit 102, input/output ports 104, read-only memory 106, random access memory 108, keep alive memory 110, and a conventional data bus. Controller 20 is shown receiving various signals from sensors coupled to engine 10, in addition to those signals previously discussed, including: engine coolant temperature (ECT) from a temperature sensor (not shown); a position sensor 134 coupled to an accelerator pedal 130 for sensing force/deflection applied by foot 132; a measurement of engine manifold absolute pressure (MAP) from pressure sensor 122 coupled to intake manifold 44; a measurement of boost pressure from pressure sensor 123; a measurement of air mass entering the engine from sensor 120; and a measurement of throttle position from a sensor (not shown). Barometric pressure may also be sensed (sensor not shown) for processing by controller 20. In a preferred aspect of the present description, an engine position sensor (not shown) produces a predetermined number of equally spaced pulses every revolution of the crankshaft from which engine speed (RPM) can be determined.

In some examples, the engine may be coupled to an electric motor/battery system in a hybrid vehicle. The hybrid vehicle may have a parallel configuration, series configuration, or variation or combinations thereof. Further, in some embodiments, other engine configurations may be employed, for example a diesel engine.

Thus, the system of FIGS. 1A and 1B provides for an engine system, comprising: a first exhaust conduit extending from a first exhaust port of a cylinder; a second exhaust conduit extending from a second exhaust port of the cylinder, the second exhaust port isolated from the first exhaust port; a gas-to-liquid heat exchanger located in a first branch of the first exhaust conduit, an outlet of the gas-to-liquid heat exchanger directed to an intake manifold and the second conduit; a turbocharger located in a second branch of the first exhaust conduit; and a first catalyst and a second catalyst located along the second conduit. The engine system further comprises a first valve located downstream of the turbocharger in a direction of exhaust flow, and a second valve located between the gas-to-liquid heat exchanger and the intake manifold, and a third valve located between the gas-to-liquid heat exchanger and second conduit. The engine system further comprises a controller including instructions for operating the first, second, and third valves such that a first portion of exhaust gases from the cylinder are directed to the intake manifold, a second portion of the exhaust gases from the cylinder are directed to the turbocharger. The engine system includes where the outlet of the gas-to-liquid heat exchanger is directed to a location in the second conduit upstream of the first catalyst in a direction of exhaust flow from the second exhaust port of the cylinder, and where an outlet of the turbocharger is directed to a location in the second conduit downstream of the first catalyst and upstream of the second catalyst in a direction of exhaust flow from the second exhaust port to the first catalyst. The engine system further comprises an EGR valve positioned intermediate the intake manifold and the gas-to-liquid heat exchanger. The engine system further comprises a controller including instructions for closing the first valve during a start of an engine where a temperature of the engine is less than a threshold amount.

Figure 3:
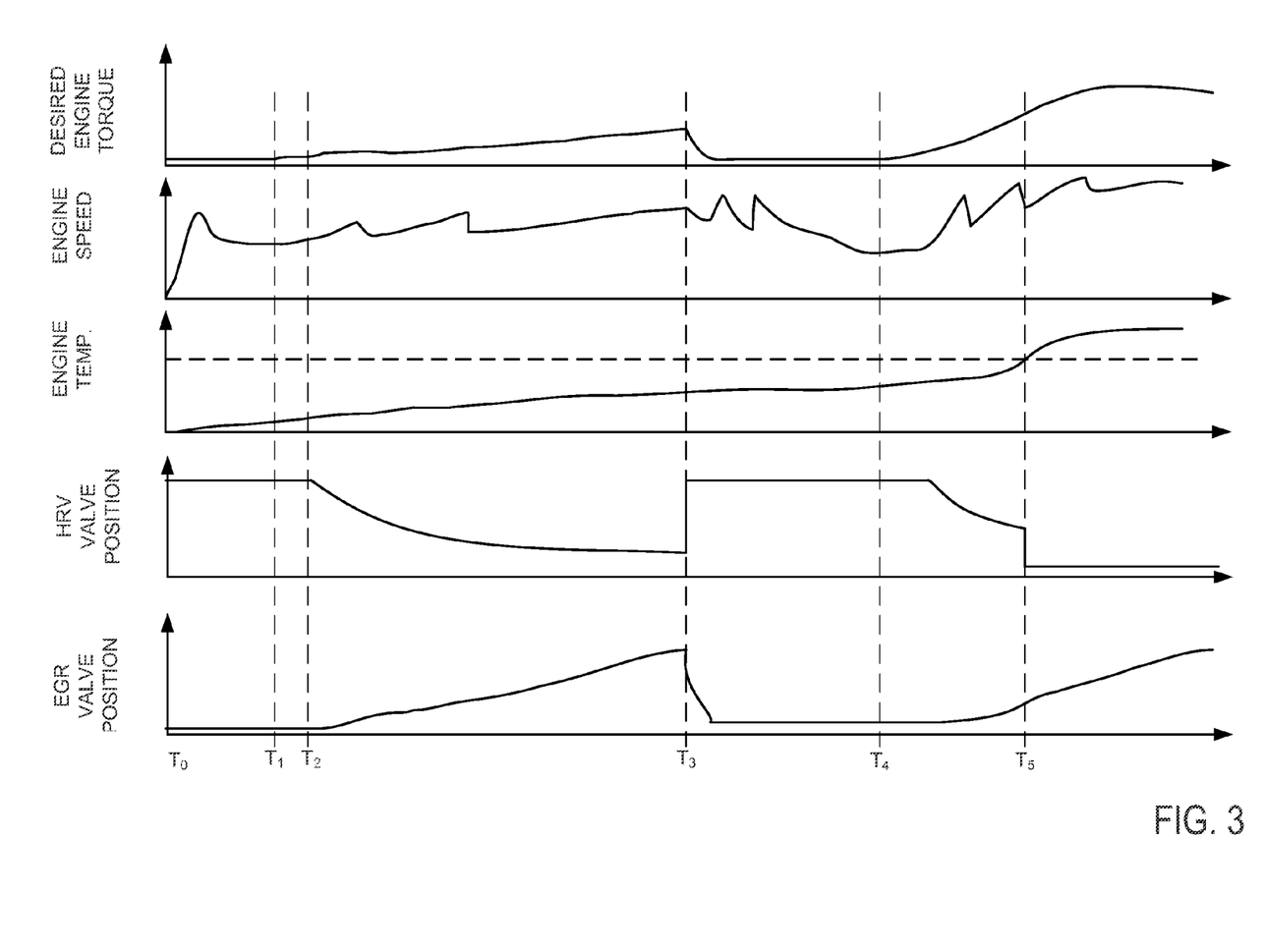
FIG. 3 shows additional simulated signals of interest when operating an engine.

Referring now to FIGS. 2 and 3, simulated signals of interest when operating an engine are shown. For each plot shown in FIGS. 2 and 3, time begins at the right side of the plot and increases to the left.

The first plot from the top of FIG. 2 represents desired engine torque. Desired engine torque may be determined from an operator's depression of a pedal or from a signal of a system (e.g., a hybrid vehicle controller). The second plot from the top of FIG. 2 represents engine speed. The third plot from the top of FIG. 2 represents engine temperature. The horizontal dotted line 202 in the engine temperature plot represents a threshold engine temperature. The fourth plot from the top of FIG. 2 represents desired engine boost. The fifth plot from the top of FIG. 2 represents the position of a turbine shut-off valve (TSV). The TSV is open when the illustrated signal is at a higher level. The TSV is closed when the illustrated signal is at a lower level. The first, second, and third plots from the top of FIG. 3 are the same as the first three plots from the top of FIG. 2. The plots are repeated to improve the viewer's identification of selected operating conditions. The fourth plot from the top of FIG. 3 represents the position of the exhaust heat recovery valve (HRV). The HRV is open when the illustrated signal is at a higher level. The HRV is closed when the illustrated signal is at a lower level. The fifth plot from the top of FIG. 3 represents the position an EGR valve. The verticals markers near $T_1$-$T_5$ are provided to show timing of events of interest.

At time $T_0$, the engine is started from cold operating conditions. Notice that engine temperature is near the bottom of the engine temperature plot so as to indicate a cooler engine temperature. As time increases to the right, engine temperature increases as the engine warms up. The desired engine torque is also at a low level indicating that the operator or other system is not requesting much engine torque (e.g., when the engine is idling). Accordingly, the desired engine boost is also low at $T_0$. The turbine shut-off valve is in a low state at $T_0$ indicating that the valve is in a closed position. By closing the turbine shut-off valve, more exhaust heat may be directed to the exhaust gas heat recovery device. Similarly, the EGR valve position signal is at a low level indicating that the EGR valve is closed. At colder engine temperatures and after an engine start, an engine may have less tolerance for EGR. Thus, the EGR valve is closed in this example. On the other hand, the HRV is set to an open position to allow exhaust gases to transfer energy to the exhaust heat recovery device during the engine start so that energy from the exhaust can be transferred to engine coolant, engine oil, transmission oil or other areas that may exhibit higher friction at lower temperatures. Further, returning exhaust heat to the engine when the engine is cold can reduce particulate emissions. Therefore, in one example, the HRV valve can be controlled to return exhaust heat to the engine until a threshold temperature at which particulate emissions for a specified engine load are less than a threshold level.

At time $T_1$, the desired engine torque signal begins to transition to a higher level indicating an increase in desired engine torque. At substantially the same time, the engine speed begins to increase. The engine speed and desired engine torque continue to increase until a level of desired torque is reached. When the desired boost reaches a level where it is desirable to start powering up the turbocharger, the turbine shut-off valve is opened to activate the turbocharger. Consequently, the TSV opens at $T_2$ as indicated by the TSV signal transitioning from a low level signal to a high level signal. At substantially the same time, the HRV begins to close so that additional amounts of exhaust gas can be directed to the turbocharger turbine. Between time $T_2$ and time $T_3$, the HRV continues to close as desired engine torque, desired boost, and engine speed increase. In addition, engine temperature continues to increase and the EGR valve is opened as indicated by the EGR valve position signal increasing.

At time $T_3$, the desired engine torque falls as do desired boost and engine speed. Desired engine torque may decrease in response an operator tipping out (e.g., at least partially releasing) of a throttle or a pedal. In response to less desired torque, the EGR valve position closes and the HRV opens. When the desired level of torque is low, the engine needs less air to provide a desired level of torque. As a result, the engine may be able to tolerate less EGR. Consequently, additional exhaust may be directed to the exhaust heat recovery device since the engine requires less exhaust gas. Between times $T_3$ and $T_4$, the engine is operated at a low load (e.g., during a deceleration).

At time $T_4$, the engine load begins to increase as do desired boost pressure, engine speed, and engine speed. Consequently, more exhaust energy is required to meet the boost demand so the HRV begins to close, thereby increasing the exhaust energy supplied to the turbine.

At time $T_5$, the engine reaches a threshold temperature as indicated by horizontal dotted line 202. In one example, the engine is at operating temperature when it reaches the temperature indicated by horizontal line 202. Consequently, exhaust heat is no longer supplied to the engine or transmission as indicated by the HRV substantially closing at $T_5$. The EGR valve position indicates that the EGR valve is opened between $T_4$ and $T_5$. Thus, exhaust may be directed to the intake manifold and to the turbine after time $T_4$. The method described in FIGS. 4A and 4B is capable of operating according to the plots of FIGS. 2 and 3.

Figure 4A:
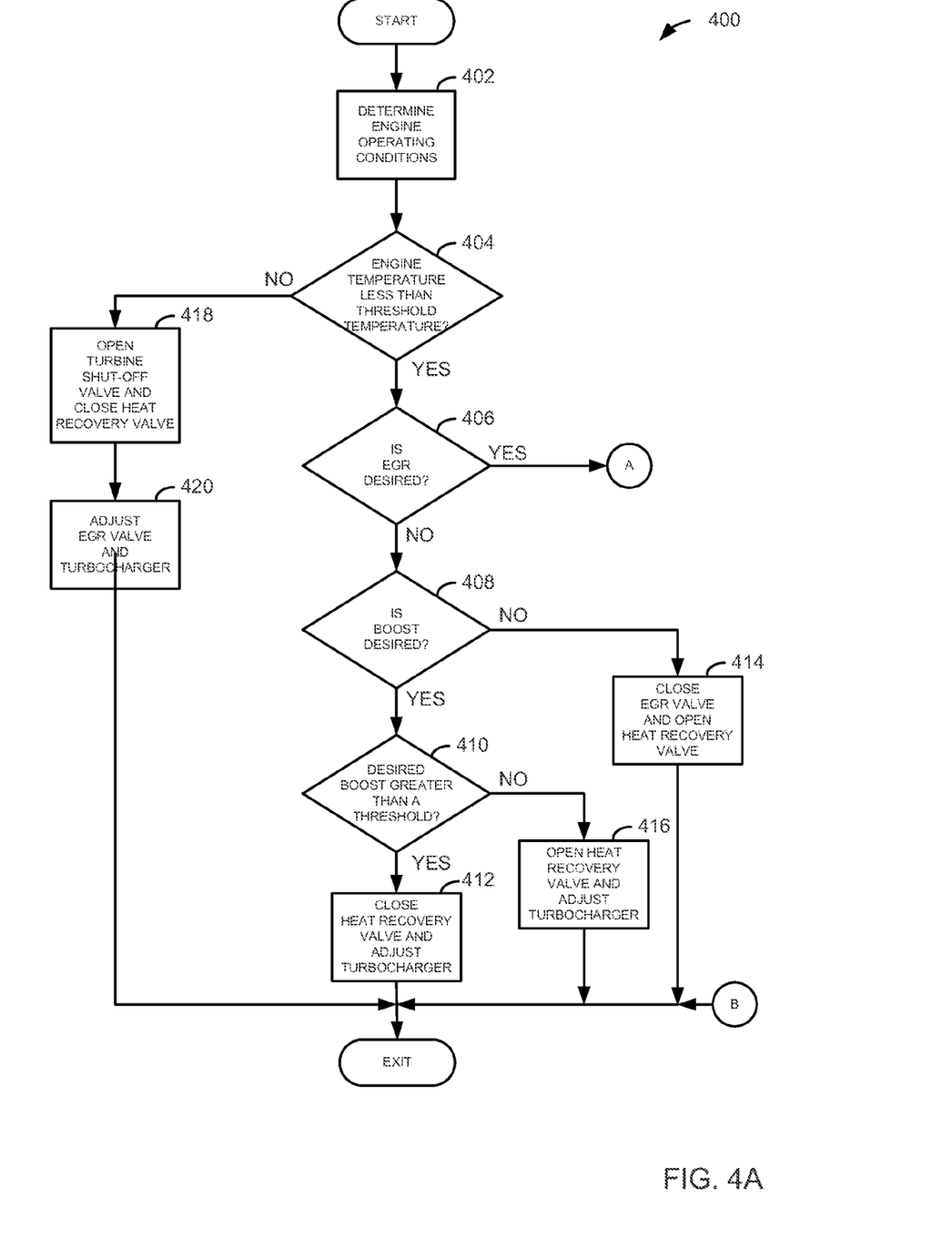
FIG. 4A is an example flowchart of a method for operating an engine.
Figure 4B:
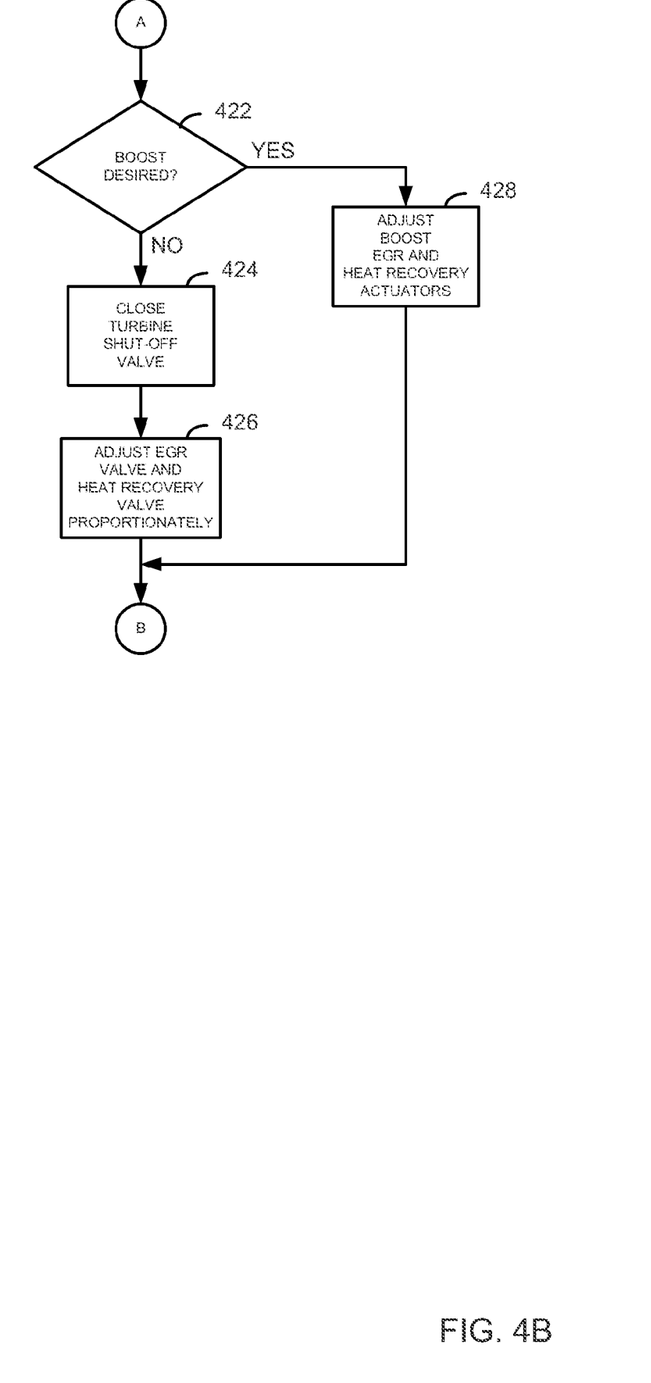
FIG. 4B is a continuation of the flowchart shown in FIG. 4A.

Referring now to FIG. 4A, an example flowchart of a method for operating an engine is shown. The numerical identifiers used in the description of FIG. 4 are based on the system of FIG. 1A.

This method prioritizes engine torque when demanded by the vehicle operator. When the operator desired torque level is satisfied by engine torque output, warm-up is prioritized by directing the path of exhaust gases. Warm-up control of exhaust gases ceases when a threshold engine temperature is reached. EGR control continues after the engine is warmed up.

At 402, engine operating conditions are determined. Engine operating conditions may include but are not limited to a temperature of the engine, atmospheric temperature and pressure, engine speed, engine load, time since engine start, number of combustion events since the engine was last stopped, intake manifold pressure, desired engine torque, engine load, boost pressure, and throttle position. Routine 400 proceeds to 404 after engine operating conditions are determined.

At 404, routine 400 judges whether or not engine temperature is less than a threshold temperature. For example, if engine temperature is less than a threshold temperature of 20 degrees C., routine 400 proceeds to 406. Otherwise, routine 400 proceeds to 418.

At 406, routine 400 judges if EGR is desired. In one example, EGR is desired during predetermined engine operating conditions. For example, when engine coolant temperature is greater than a threshold temperature, when engine load is greater than a first threshold engine load and less than a second threshold engine load, and when engine speed is greater than a first threshold engine speed and less than a second threshold engine speed. If routine 400 judges that EGR is desired, routine 400 proceeds to 422 of FIG. 4B. Otherwise, routine 400 proceeds to 408.

At 408, routine 400 judges if boost is desired. In one example, an amount of boost provided by a compressor such as a turbocharger may be determined in response to an operator engine torque demand from a pedal sensor or other device. In another example, an amount of boost may be determined in response to a hybrid controller. If boost is desired, routine 400 proceeds to 410. Otherwise, routine 400 proceeds to 414.

At 410, routine 400 judges whether or not desired boost is greater than a threshold amount. In one example, the threshold amount of boost is related to a higher level of desired torque so that substantially full engine power is available to the operator. In another example, the threshold amount of boost may be related to an engine temperature or another engine operating condition. If the desired boost is greater than a threshold amount, routine 400 proceeds to 412. Otherwise, routine 400 proceeds to 416.

At 412, routine closes a heat recovery valve, opens a turbine shut-off valve, closes an EGR valve, and adjusts the turbocharger to provide the desired level of boost. By closing the heat recovery valve at 412 and EGR valve 142, substantially all exhaust energy in exhaust manifold 80 can be directed to turbine 164. As such, engine power output may be increased by allowing compressor 162 to provide higher levels of boost to the engine. In one example, the turbine waste gate or vane position can be adjusted in response to a difference between a desired boost pressure and an observed or measured boost pressure. The desired boost pressure can be determined from empirically determined boost values that are indexed by engine speed and desired engine torque.

In one example at 412, the cam phase of exhaust valves that control flow into exhaust runners 82 can be adjusted to vary timing of when blow-down gases are released to exhaust runners 82 from cylinders 12, 14, 16, and 18. In particular, at lower engine speeds exhaust timing of valves that control exhaust flow to exhaust runners 82 can be such that the exhaust valve opens relatively late and closes substantially at BDC expansion stroke of the cylinder. At higher engine speeds exhaust timing of valves that control exhaust flow to exhaust runners 82 can be such that the exhaust valve opens relatively early and closes before BDC expansion stoke of the cylinder. Thus, the timing of the exhaust valves that control exhaust flow to exhaust runners 82 is retarded at lower engine speeds.

The timing of exhaust valves that control flow from cylinders 12, 14, 16, and 18 to exhaust runners 86 can also be adjusted at 412. In particular, valves controlling exhaust gas flow to exhaust runners 86 are also retarded at lower engine speeds. In particular, valves controlling exhaust gas flow to exhaust runners 86 are opened at substantially BDC exhaust stroke at lower engine speeds. At higher engine speeds, valves controlling exhaust gas flow to exhaust runners 86 are opened before BDC exhaust stroke. Thus, the exhaust valves that control exhaust gas flow to exhaust runners 82 control the flow of blow-down gases from cylinders 12, 14, 16, and 18 to exhaust manifold 80. And, the exhaust valves that control exhaust gas flow to exhaust runners 84 control the flow of residual gases from cylinders 12, 14, 16, and 18 to engine exhaust manifold 84. By separating the blow-down gas from the residual gas, exhaust gases with higher energy can be directed to the turbine and the exhaust heat recovery device.

At 416, routine 400 opens the heat recovery valve, closes the EGR valve, opens the turbine shut-off valve, and adjusts the turbocharger. Thus, at 416 it is desirable to provide boost and recover heat energy from the exhaust. Heat energy from the exhaust may be used to more quickly warm the engine by transferring the heat energy to the engine coolant. Further, the exhaust heat energy may be used to heat the transmission. In these ways, the exhaust gas may be used to reduce engine friction during a cold start.

In one example, the HRV (e.g., 140 of FIG. 1B) can be adjusted to operate similar to a turbocharger waste gate so that exhaust gas energy that is not needed to provide a desired level of boost is provided to the exhaust heat recovery device. For example, if the turbine is providing or capable of providing a desired level of boost with less than the amount of exhaust gas provided by the engine via exhaust manifold 80, then the exhaust gas heat recovery valve 140 can be at least partially opened to allow flow through the exhaust heat recovery device 146. When the exhaust heat recovery valve acts as a turbine bypass for a portion of exhaust gases traveling through exhaust manifold 80, the waste gate or vanes of turbine 164 can be set such that the turbine is operating at substantially its highest efficiency given the exhaust flow to the turbine. For example, the turbine waste gate can be closed or the vanes can be set at a highly efficient position. Further, if the engine is operating at cold start conditions, the turbine shut-off valve may be closed until the engine reaches a desired engine speed or temperature so that substantially all the exhaust heat is recovered by the exhaust heat recovery device 146.

In another example, the HRV is adjusted so that a proportion of the exhaust energy is directed to the exhaust heat recovery device. For example, the HRV position can be adjusted in response to engine load or desire engine torque so that a portion of exhaust energy is directed to heat recovery device 146 while the remainder of the exhaust gas energy is directed to the turbine 164. Of course, the percentage of exhaust gases directed to the heat recovery device can be varied depending on engine operating conditions. For example, if the engine is cold the percentage of exhaust gases directed to the exhaust gas heat recovery device can be higher than the percentage of exhaust gases directed to the turbine. Under substantially the same engine operating conditions, but at a higher engine temperature, the percentage of exhaust gases directed to the turbine can be greater than the percentage of exhaust gases directed to the exhaust gas heat recovery device.

At 414, routine 400 closes the EGR valve, opens the HRV, and closes the EGR valve. Since EGR and boost are not required at 414, substantially all exhaust energy in exhaust manifold 80 can be directed to the exhaust gas heat recovery device 146. This mode of operation may be particularly useful during engine starting because a higher amount of exhaust gas energy can be recovered by the exhaust gas heat recovery device.

At 422, routine 400 judges whether or not boost is desired. In one example, an amount of boost is determined as described at 408. In particular, boost may be determined in response to an operator engine torque demand from a pedal sensor or other device or in response to a hybrid controller. If boost is desired, routine 400 proceeds to 428. Otherwise, routine 400 proceeds to 424.

At 428, routine 400 opens the EGR valve, opens the HRV valve, and opens the turbine shut-off valve. Thus, routine 400 can provide EGR, turbine power, and recovered exhaust heat at least under some conditions. In one example, priority can be assigned to EGR, boost, and exhaust heat recovery during different operating conditions. For example, an amount of exhaust energy used to provide boost can be given higher priority as compared to exhaust for EGR and the amount of exhaust for EGR can be given priority over the amount of exhaust provided to the exhaust gas heat recovery device. Thus, if the amount of exhaust heat energy provided by the engine to exhaust manifold is insufficient to operate the turbine, the EGR valve, and the exhaust heat recovery device under some engine operating conditions, the available exhaust energy can be directed to areas with higher priority by at least partially closing either the EGR valve, the HRV, or the turbine shut-off valve. In one example, the amount of available exhaust energy can be determined based on engine load and exhaust valve timing.

In one example, a desired pressure in exhaust manifold 80 is established in response to engine operating conditions (e.g., engine speed and desired engine torque). Further, the EGR valve position is adjusted in response to a desired EGR flow rate and a pressure differential between exhaust manifold 80 and intake manifold. The HRV valve position is varied to maintain the desired exhaust pressure in exhaust manifold 80. During conditions where the desired pressure of manifold 80 cannot be maintained by adjusting the HRV, the HRV may be closed.

At 424, routine 400 closes the turbine shut-off valve. By closing the turbine shut-off valve, additional exhaust gases can be directed to EGR and heat recovery. Routine 400 proceeds to 426 after the turbine shut-off is shut off.

At 426, routine 400 adjusts the EGR valve and the HRV proportionally to provide EGR and recovered exhaust heat. In particular, the EGR valve is adjusted to provide the desired EGR flow rate by adjusting the position of the EGR valve in response to a desired EGR flow rate and the pressure differential between the exhaust manifold 80 and the intake manifold 44. The HRV is adjusted to provide a desired level of pressure in exhaust manifold 80. The desired level of pressure in the exhaust manifold is determined in response to engine speed and desired torque. Thus, the HRV is adjusted in response to engine speed and desired torque to provide a desired level of pressure in exhaust manifold 80.

At 418, routine 400 opens the turbine shut-off valve, closes the HRV. The HRV valve is closed to increase the level of exhaust energy supplied to the EGR valve and the turbine. In this way, the output of the turbine may be increased. Routine 400 proceeds to 420 after the turbine shut-off valve is opened and after the HRV is closed.

At 420, routine 400 adjusts the EGR valve position and the turbocharger. The EGR valve position is adjusted based on a desired EGR rate and the pressure differential between the intake manifold 44 and the exhaust manifold 80. The turbine waste gate is adjusted according to desired boost pressure and compressor speed. In one example, the waste gate is opened when compressor speed exceeds a threshold. Further, the waste gate is opened in response to boost pressure exceeding a desired boost pressure.

Thus, the methods of FIGS. 4A and 4B provides for an engine method, comprising: opening a first exhaust valve of a cylinder before a piston of the cylinder reaches BDC compression stroke of the cylinder; directing exhaust gases across the first exhaust valve into a first conduit; recovering heat from the exhaust gases in the first conduit to a liquid; and returning the exhaust gases to a second conduit that is in communication with a second exhaust valve of the cylinder. The engine method also includes where the first exhaust valve is closed at or before BDC compression stroke of the cylinder. The engine method includes where the second exhaust valve of the cylinder opens after BDC exhaust stroke of the cylinder. The engine method includes where a portion of the exhaust gases are directed to an intake manifold of a turbocharged engine. The engine method includes where the heat is recovered via a gas-to-liquid heat exchanger. The engine method includes where the portion of the exhaust gases are returned to the exhaust passage in communication with the second exhaust valve at a location upstream of a first catalyst in a direction of exhaust flow. The engine method includes where a portion of the exhaust gases are directed to a turbine and bypass the gas-to-liquid heat exchanger.

The method of FIGS. 4A and 4B also provides for an engine method, comprising: during a first mode, opening a first exhaust valve of a cylinder before a piston of the cylinder reaches BDC compression stroke of the cylinder; flowing exhaust gases from a first combustion in the cylinder across the first exhaust valve; recovering heat from the exhaust gases from the first combustion to a liquid; returning the exhaust gases from the first combustion to an exhaust passage in communication with a second exhaust valve of the cylinder, the exhaust gases from the first combustion bypassing a turbine; during a second mode, opening a first exhaust valve of a cylinder before a piston of the cylinder reaches BDC compression stroke of the cylinder; flowing exhaust gases from a second combustion in the cylinder across the first exhaust valve; and returning the exhaust gases from the second combustion to the exhaust passage in communication with the second exhaust valve of the cylinder bypassing a gas-to-liquid heat exchanger. The engine method includes where during the second mode, the exhaust gases from the second combustion are introduced to the exhaust passage in communication with the second exhaust valve at a location downstream of a first catalyst in a direction of exhaust flow from the second exhaust valve. The engine includes where during the first mode, a turbine shut-off valve is in a closed position, and where during the second mode the turbine shut-off valve is in an open position. The engine method includes where during the first mode, an EGR valve downstream of gas-to-liquid heat exchanger in the direction of exhaust flow is closed. The engine method includes where during the first mode, the exhaust gases from the first combustion are returned to the exhaust passage in communication with the second exhaust valve of the cylinder at a location upstream of a first catalyst in a direction of exhaust flow from the second exhaust valve. The engine method includes where during the second mode, the exhaust gases from the first combustion are returned to the exhaust passage in communication with the second exhaust valve of the cylinder at a location downstream of a first catalyst in a direction of exhaust flow from the second exhaust valve. The engine method further comprises directing a portion of the exhaust gases from the first combustion to an intake manifold.

As will be appreciated by one of ordinary skill in the art, routines described in FIGS. 4A-4B may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. An engine method, comprising:
    opening a first exhaust valve of a cylinder before a piston of the cylinder reaches BDC compression stroke of the cylinder;
    directing exhaust gases across the first exhaust valve into a first conduit;
    recovering heat from the exhaust gases in the first conduit to a liquid; and
    returning the exhaust gases after recovering exhaust heat to a second conduit that is in communication with a second exhaust valve of the cylinder.

2. The engine method of claim 1, where the exhaust gases directed across the first exhaust valve are separated from exhaust gases directed across the second exhaust valve at least until the exhaust gases directed across the first exhaust valve pass through a valve.

3. The engine method of claim 1, where the second exhaust valve of the cylinder opens after BDC exhaust stroke of the cylinder.

4. The engine method of claim 1, where a portion of the exhaust gases are directed to an intake manifold of a turbocharged engine.

5. The engine method of claim 1, where the heat is recovered via a gas-to-liquid heat exchanger.

6. The engine method of claim 5, where a portion of the exhaust gases are directed to a turbine and bypass the gas-to-liquid heat exchanger.

7. The engine method of claim 1, where the portion of the exhaust gases are returned to the exhaust passage in communication with the second exhaust valve at a location upstream of a first catalyst in a direction of exhaust flow.

8. An engine method, comprising:
    during a first mode,
        opening a first exhaust valve of a cylinder before a piston of the cylinder reaches BDC compression stroke of the cylinder;
        flowing exhaust gases from a first combustion in the cylinder across the first exhaust valve;
        recovering heat from the exhaust gases from the first combustion to a liquid;
        returning the exhaust gases after recovering exhaust heat from the first combustion to an exhaust passage in communication with a second exhaust valve of the cylinder, the exhaust gases from the first combustion bypassing a turbine;
    during a second mode,
        opening a first exhaust valve of a cylinder before a piston of the cylinder reaches BDC compression stroke of the cylinder;
        flowing exhaust gases from a second combustion in the cylinder across the first exhaust valve; and
        returning the exhaust gases after recovering exhaust heat from the second combustion to the exhaust passage in communication with the second exhaust valve of the cylinder bypassing a gas-to-liquid heat exchanger.

9. The engine method of claim 8, where during the second mode, the exhaust gases from the second combustion are introduced to the exhaust passage in communication with the second exhaust valve at a location downstream of a first catalyst in a direction of exhaust flow from the second exhaust valve.

10. The engine method of claim 8, where during the first mode, a turbine shut-off valve is in a closed position, and where during the second mode the turbine shut-off valve is in an open position.

11. The engine method of claim 8, where during the first mode, an EGR valve downstream of the gas-to-liquid heat exchanger in a direction of exhaust flow is closed.

12. The engine method of claim 8, where during the first mode, the exhaust gases from the first combustion are returned to the exhaust passage in communication with the second exhaust valve of the cylinder at a location upstream of a first catalyst in a direction of exhaust flow from the second exhaust valve.

13. The engine method of claim 12, where during the second mode, the exhaust gases from the first combustion are returned to the exhaust passage in communication with the second exhaust valve of the cylinder at a location downstream of a first catalyst in a direction of exhaust flow from the second exhaust valve.

14. The engine method of claim 8, further comprising directing a portion of the exhaust gases from the first combustion to an intake manifold.

15. An engine system, comprising:
    a first exhaust conduit extending from a first exhaust port of a cylinder;
    a second exhaust conduit extending from a second exhaust port of the cylinder,
    the second exhaust port isolated from the first exhaust port;
    a gas-to-liquid heat exchanger located in a first branch of the first exhaust conduit, an outlet of the gas-to-liquid heat exchanger directed exhaust flow to an intake manifold and the second conduit;

a turbocharger located in a second branch of the first exhaust conduit; and a first catalyst and a second catalyst located along the second conduit.

16. The engine system of claim 15, further comprising:

a first valve located downstream of the turbocharger in a direction of the exhaust flow, and a second valve located between the gas-to-liquid heat exchanger and the intake manifold, and a third valve located between the gas-to-liquid heat exchanger and the second conduit.

17. The engine system of claim 16, further comprising a controller including instructions for operating the first, second, and third valves such that a first portion of exhaust gases from the cylinder are directed to the intake manifold, and a second portion of the exhaust gases from the cylinder are directed to the turbocharger.

18. The engine system of claim 16, further comprising a controller including instructions for closing the first valve during a start of an engine where a temperature of the engine is less than a threshold amount.

19. The engine system of claim 15, where the outlet of the gas-to-liquid heat exchanger is directed to a location in the second conduit upstream of the first catalyst in a direction of the exhaust flow from the second exhaust port of the cylinder, and where an outlet of the turbocharger is directed to a location in the second conduit downstream of the first catalyst and upstream of the second catalyst in a direction of the exhaust flow from the second exhaust port to the first catalyst.

20. The engine system of claim 19, further comprising an EGR valve positioned intermediate the intake manifold and the gas-to-liquid heat exchanger.

* * * * *